United States Patent
Deros (10) Patent No.: US 8,894,024 B2
(45) Date of Patent: Nov. 25, 2014

(54) ADAPTER AND MECHANISM FOR ATTACHING ACCESSORIES TO SUPPORT STRUCTURES

(76) Inventor: Mark A. Deros, Lubbock, TX (US)

( * ) Notice: Subject to any disclaimer, the term of this patent is extended or adjusted under 35 U.S.C. 154(b) by 101 days.

(21) Appl. No.: 13/454,665

(22) Filed: Apr. 24, 2012

(65) Prior Publication Data

US 2012/0273631 A1    Nov. 1, 2012

Related U.S. Application Data

(60) Provisional application No. 61/479,712, filed on Apr. 27, 2011.

(51) Int. Cl.
*A47F 5/00*     (2006.01)
*A47F 7/00*     (2006.01)
*F16M 11/00*    (2006.01)
*F16M 13/00*    (2006.01)

(52) U.S. Cl.
USPC ............... 248/124.1; 248/278.1; 248/284.1

(58) Field of Classification Search
CPC ................................ H01Q 1/12; H01Q 1/235
USPC .......... 42/94, 419; 92/15, 61; 248/121, 163.1, 248/165, 177.1, 124.1, 284.1, 278.1; 89/37.04; 343/880, 765
See application file for complete search history.

(56) References Cited

U.S. PATENT DOCUMENTS

| | | | |
|---|---|---|---|
| 3,358,504 A * | 12/1967 | Freebairn ........................ 73/167 |
| 4,819,006 A * | 4/1989 | Whitesides et al. .......... 343/880 |
| 5,347,740 A | 9/1994 | Rather |
| 6,044,747 A | 4/2000 | Felts |
| 6,272,785 B1 | 8/2001 | Mika |
| 6,574,899 B1 | 6/2003 | Mostello |
| 7,047,863 B2 * | 5/2006 | Hawkes et al. .............. 89/37.04 |
| 7,086,192 B2 | 8/2006 | Deros |
| 7,730,824 B1 * | 6/2010 | Black ........................... 89/37.03 |
| 7,828,256 B2 | 11/2010 | Speggiorin |
| 8,200,150 B2 * | 6/2012 | Lopez et al. ................. 455/13.2 |
| 2010/0102178 A1 | 4/2010 | Smith |
| 2011/0197748 A1 * | 8/2011 | Roberts et al. .............. 89/37.04 |

* cited by examiner

*Primary Examiner* — Amy J Sterling
(74) *Attorney, Agent, or Firm* — Sarah Hegi Simpson; McWhorter, Cobb & Johnson, LLP (57) ABSTRACT

The present disclosure relates to an adapter and a mechanism for attaching accessories to support structures. The adapter generally comprises a base configured for attachment to a support structure; a housing connected to the base; at least one rotating member coupled with the housing; a locking means arranged and configured to selectively engage the at least one rotating member; an accessory attachment member configured to receive at least one accessory; and at least one arm having a first end connected to the accessory attachment member and having a second end connected to the at least one rotating member.

20 Claims, 7 Drawing Sheets

ADAPTER AND MECHANISM FOR ATTACHING ACCESSORIES TO SUPPORT STRUCTURES

CROSS-REFERENCE TO RELATED APPLICATIONS

This application is related to and claims priority from earlier filed U.S. Provisional Patent Application No. 61/479,712, filed Apr. 27, 2011.

BACKGROUND OF THE INVENTION

1. Field of the Invention

The present invention relates generally to accessory support structures. More specifically, the present invention relates to adapters for attaching accessories (e.g., firearms) to support structures (e.g., tripods).

2. Description of the Prior Art

Support structures, such as tripods, are often used for supporting accessories such as photographic and video cameras. Though most tripods were originally designed for use with video and/or photographic cameras, such camera-style tripods are increasingly being used by firearm users to support heavy firearms, to provide increased shooting accuracy and to reduce motion from recoil.

Many firearm users have started taking advantage of the benefits of using tripods and similar support structures in conjunction with firearms. For example, firearm users such as hunters, military personnel and specialized police units, oftentimes must wait for long periods of time before an anticipated target appears. Such users may employ tripods to support the firearm and decrease user fatigue while waiting for an anticipated target. Additionally, many external conditions such as the physical environment, terrain and weather, dictate a firearm user's shooting location and shooting position. A tripod, however, allows a firearm user to overcome adverse shooting conditions by providing an adjustable shooting platform that allows the user to shoot in prone, sitting, kneeling or standing positions.

Cameras and similar accessories are generally configured for direct attachment to camera-style tripods, which come equipped with any of a variety of tripod heads for accessory attachment. For example, as is well known in the art, many camera-style tripods come equipped with a standard quick-attach tripod head that accepts a standard camera mounting plate. The camera mounting plate may be mounted to a bottom surface of a camera or similar accessory, thereby allowing the accessory to be quickly and releasably attached to the quick-attach tripod head.

Due to differences in size, shape, weight and application of cameras compared to firearms, however, firearms are not generally adapted for direct attachment to tripod heads. Thus, adapters, including a variety of gun rests and arm rests, have been employed to enable attachment of firearms to tripod heads. Design problems in current adapters, however, present several disadvantages.

For example, many current devices are designed to provide shooting rests so that a user can rest his or her arms while trying to maintain a firearm in a nonmoving position. Even with the help of a gun rest and/or an arm rest, however, it is unfeasible for a user to hold a firearm in a nonmoving position for an extended period of time. This creates a problem for a firearm user because even the slightest movement of the firearm barrel translates into large deviations from long-range targets. Additionally, current devices that purport to physically support a firearm user while awaiting a target, are generally large, cumbersome and heavy. Consequently, these devices create a considerable amount of additional equipment for a user to carry into the field and these devices cannot be easily moved from location to location. Further, most current devices attach to a firearm at two points—the forearm of the firearm and the stock of the firearm. Such attachment complicates disengagement of the firearm from the support structure which could thereby create a dangerous situation for certain users (e.g., military personnel in combat situations).

Currently, a need exists for an accessory adapter for firearms and similar accessories that can be easily and quickly attached to and removed from a number of different types of support structures including tripods and bipods. There is a need for an accessory adapter that is compact and lightweight, thereby making said adapter easy to transport and store. An adapter is needed that will transform standard camera tripods into versatile shooting platforms that can support firearms. In addition, an adapter is needed that allows a user to interchange accessories (e.g., a camera, firearm, spotting scope, binoculars, etc.) using the same support structure. An adapter is needed that does not require support for both the forearm of a firearm and the stock of the firearm. Further, an adapter is needed that allows the firearm to be disengaged quickly from the support structure under field conditions. Unlike existing gun rests that are unstable and cumbersome to adjust, a need exists for an adapter that allows a user to quickly and effortlessly make precise adjustments of the firearm. Similarly, a device is needed that reduces the possibility of alerting a potential target to the user's presence by providing for minimal movement of the firearm as the user gets into a firing position.

In view of the foregoing, it is apparent that a need exists in the art for an adapter and a mechanism for attaching accessories to support structures which overcomes, mitigates or solves the above problems in the art. It is a purpose of this invention to fulfill this and other needs in the art which will become more apparent to the skilled artisan once given the following disclosure.

OBJECTS AND SUMMARY OF THE INVENTION

It is an object of the present invention to overcome the above described drawbacks associated with current devices. To achieve these and other advantages and in accordance with the purpose of the invention, as embodied and broadly described, the present disclosure describes an adapter and a mechanism for attaching accessories (e.g., firearms) to support structures (e.g., tripods).

The adapter generally comprises a base configured for attachment to a support structure; a housing connected to the base; at least one rotating member coupled with the housing; a locking means arranged and configured to selectively engage the at least one rotating member; an accessory attachment member configured to receive an accessory; and at least one arm having a first end connected to the accessory attachment member and having a second end connected to the rotating member.

The adapter disclosed herein provides numerous advantages over current devices. For example, the base of the present adapter is preferably designed to be easily and quickly attached to and removed from a support structure. The base may be designed, for example, as a standard camera mounting plate that can be quickly and releasably attached to a quick-attach tripod head mount.

Additionally, unlike existing gun rests that are unstable and cumbersome to maneuver and adjust, the present adapter is designed to be compact and lightweight so that set-up, dismantle, and transport is quick and easy. Such features of the present adapter are provided by the adapter's ability to support a firearm by means of one, rather than two, attachment points, as well as the adapter's ability to lock the firearm in place on the support structure without requiring holding support from the user.

A further advantage resides in the ability of the present adapter to transform standard camera tripods into versatile shooting platforms that support firearms. For example, the adapter may be mounted on a panning tripod head, thereby allowing a user to pan an attached firearm 360-degrees. At the same time the adapter allows the user to tilt the firearm upwards and downwards approximately 180-degrees. This enables the user to shoot a target at any angle by simply panning or tilting the firearm, without moving or readjusting the location of the tripod.

An additional advantage provided by the adapter is that it includes a locking mechanism that allows for precise, minute and effortless adjustments of the attached accessory. A user can manually move a locking lever back and forth to move the locking means to a locked position or to an unlocked position. The locking means, in conjunction with the adapter's ability to vertically tilt attached accessories upwards and downwards, provides a stable and consistent supporting means for firearms that allows a firearm user to lock a firearm in place at an extreme uphill or downhill angle. Furthermore, these features allow the user to lock an accessory in a non-moving position for hours, without holding support from the user, so that the user may do as he or she wishes while waiting for an anticipated target to appear. When the target does appear, utilizing the present adapter reduces the possibility of alerting the target to the user's presence by providing for minimal movement of the firearm, and requiring no movement of the support structure, as the user gets into a firing position.

Another advantage of the presently disclosed device resides in the ability of the adapter to support attachment of multiple accessories at once. In one of the embodiments contemplated by the present invention, the accessory attachment member includes a side attachment means for attachment of multiple accessories using one adapter and one support structure. For example, it may be desirable or beneficial for many users, such as hunters and police officers, to attach both a firearm and a video camera to the accessory attachment member at once, thereby allowing the user to document each shot fired as the camera moves in unison with the firearm.

An additional advantage of the present adapter is that, when mounted on a tripod, for example, the present adapter allows a user to use a firearm in many different terrains and environments, and in prone, kneeling, sitting or standing positions. Further, when the present adapter is used to attach a firearm to a support structure such as a tripod, recoil that would normally be experienced by the user can be substantially reduced due to the added weight of the attached support structure.

These, together with other objects of the invention, along with various features of novelty that characterize the invention, are pointed out with particularity in the claims annexed hereto and forming a part of this disclosure. For a better understanding of the invention, its operating advantages, and the specific objects attained by its uses, reference should be had to the accompanying drawings and descriptive matter in which there is described illustrative embodiments of the invention.

BRIEF DESCRIPTION OF THE DRAWINGS

The accompanying drawings, which are incorporated in and form a part of the specification, illustrate embodiments of the present invention, and together with the description, serve to explain the principles of the invention. It is to be expressly understood that the drawings are for the purpose of illustration and description only and are not intended as a definition of the limits of the invention. In the drawings.

DETAILED DESCRIPTION OF ILLUSTRATIVE EMBODIMENTS

Referring now to FIGS. 1-18, exemplary embodiments of an adapter and mechanism for attaching accessories to support structures in accordance with the present disclosure are illustrated. Please note, references to terms such as "upper," "lower," "backwards," "forwards," "upwards," "downwards," "horizontal" and "vertical" are arbitrary and refer only to the illustrated configurations.

The adapter 25 includes a base 26 configured for attachment to a support structure 35; a housing 27 connected to said base 26; at least one rotating member 28 coupled with said housing 27; a locking means 45 arranged and configured to selectively engage said at least one rotating member 28; an accessory attachment member 32 configured to receive an accessory (e.g., 36, 38 and 39); and at least one arm 29 having a first end 46 and a second end 47, said first end 46 being connected to said accessory attachment member 32 and said second end 47 being connected to said rotating member 28.

The base 26 of the adapter 25 is configured to attach to a support structure 35. There are many different types of support structures 35 (e.g., tripods, bipods, monopods, bench mounts, etc.) that may be used with the present device, and thus the base 26 of the adapter 25 may be configured in many different ways in order to attach to the support structure 35 being employed by a user. One skilled in the art can appreciate that there are many configurations that exist for the base member 26 for attachment to a support structure 35, all of which are considered to be within the spirit and scope of the present invention.

Figure 2:
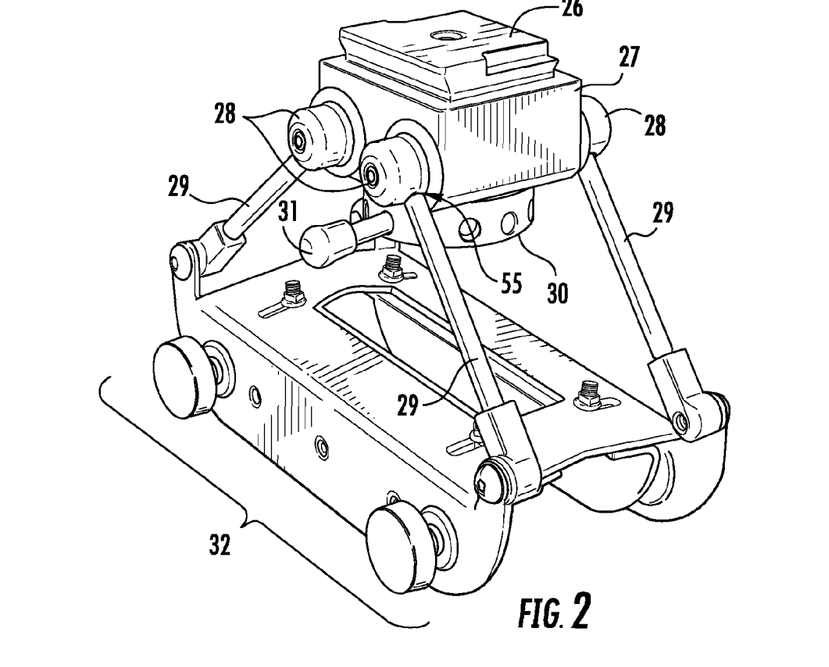
FIG. 2 is a bottom perspective view of the adapter shown in FIG. 1.
Figures 5, 6, 7, 8:
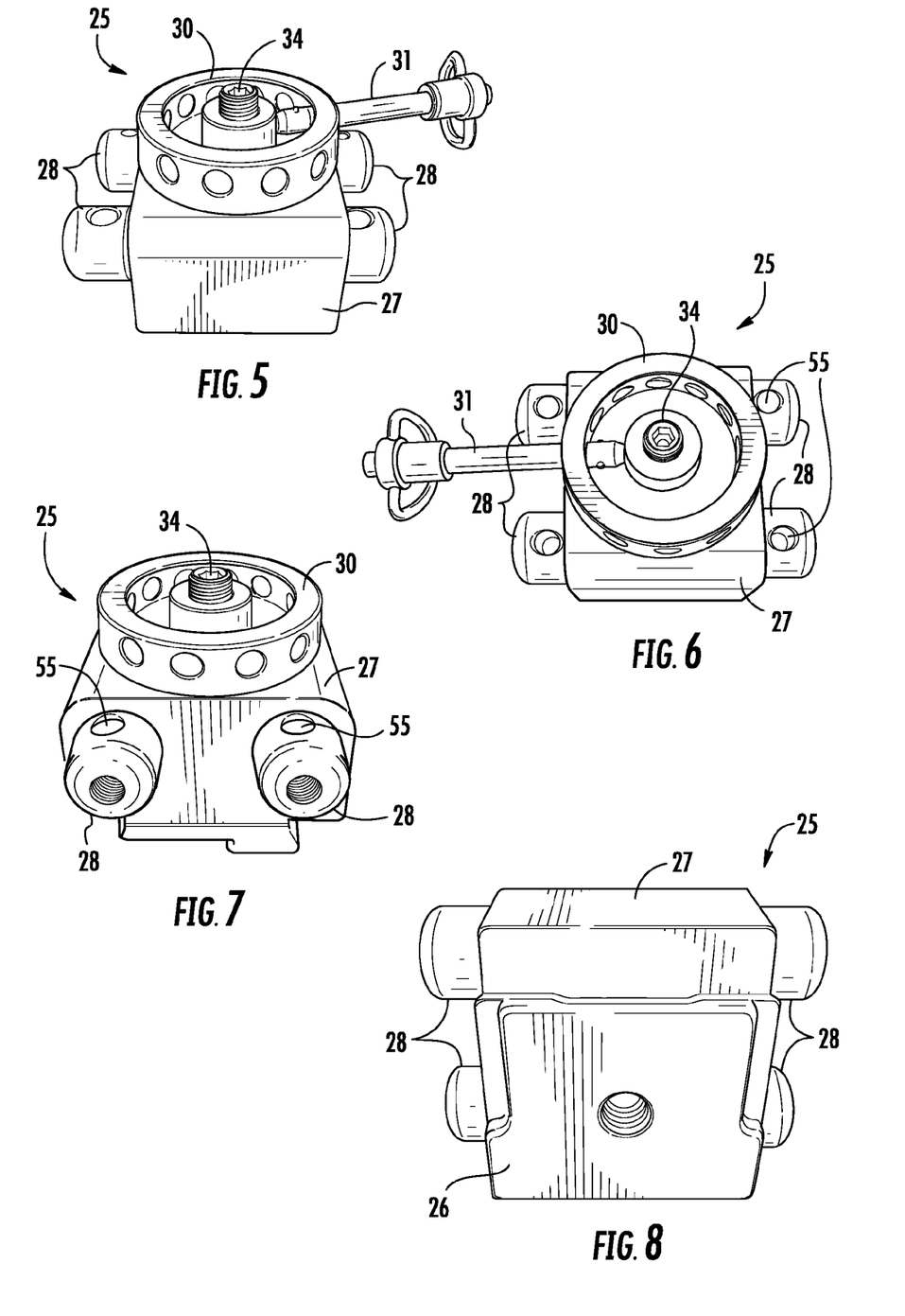
FIG. 5 is a front view of the lower portion of the adapter shown in FIG. 1.
FIG. 6 is a top view of the lower portion of the adapter shown in FIG. 1.
FIG. 7 is a side view of the lower portion of the adapter shown in FIG. 1.
FIG. 8 is a bottom view of the lower portion of the adapter shown in FIG. 1.

As depicted in FIGS. 2 and 8, the base 26 is configured to be easily and quickly attached to and removed from a support structure 35. In one of the embodiments contemplated by the present disclosure, the base 26 of the adapter 25 is configured as a camera mounting plate (as shown in FIGS. 2 and 8) and the support structure 35 includes a quick-attach head mount, as is widely used on camera tripods and as is well known in the art. In this embodiment, a user can quickly attach and detach the adapter 25 to and from the quick-attach head mount on the support structure 35, using only one hand and without the necessity of tools.

Figures 9, 10, 11:
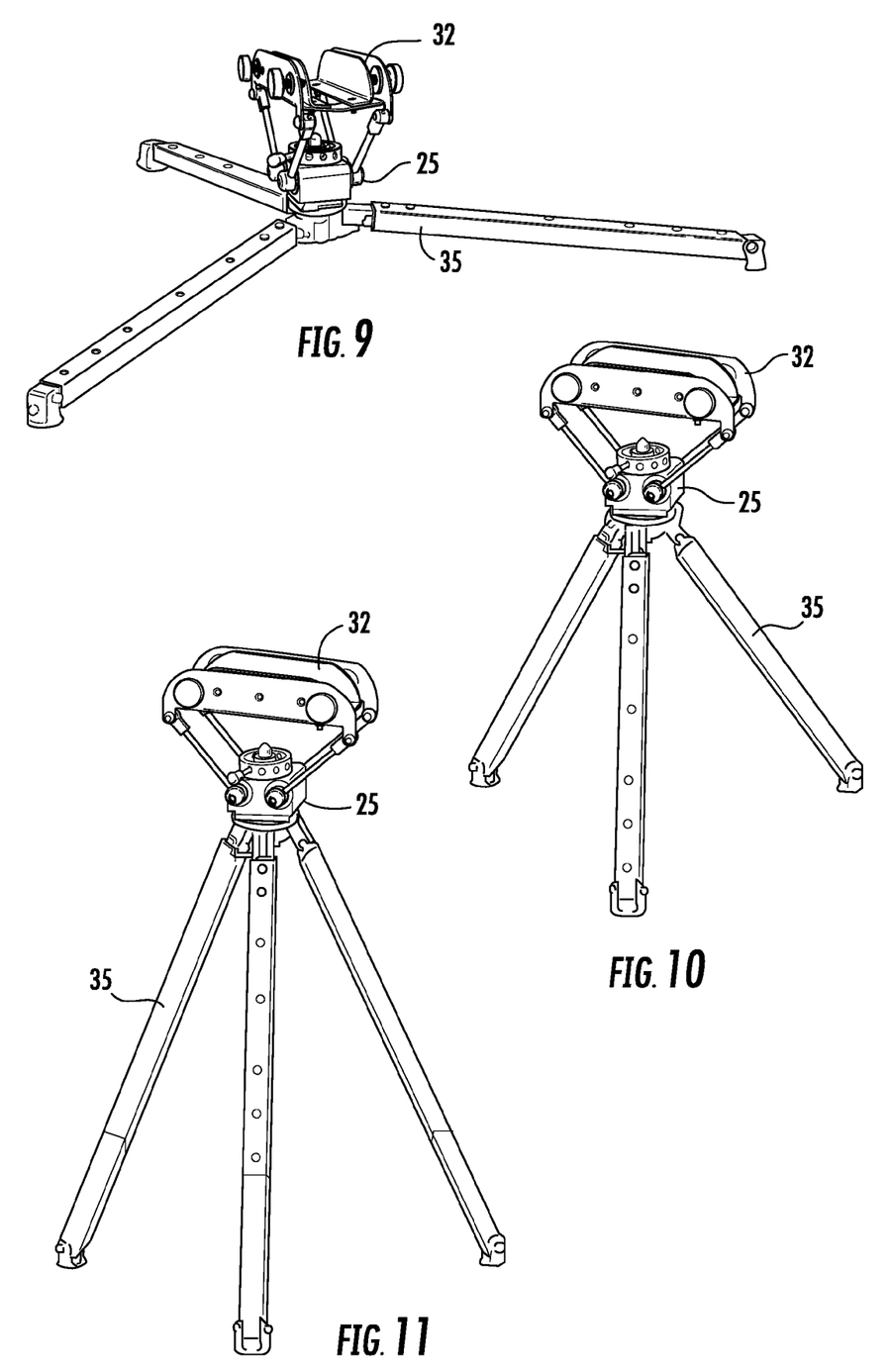
FIG. 9 is a perspective view of the adapter shown in FIG. 1, illustrating the adapter attached to a support structure in a prone position.
FIG. 10 is a perspective view of the adapter shown in FIG. 1, illustrating the adapter attached to a support structure in a sitting or kneeling position.
FIG. 11 is a perspective view of the adapter shown in FIG. 1, illustrating the adapter attached to a support structure in a standing position.
Figure 12:
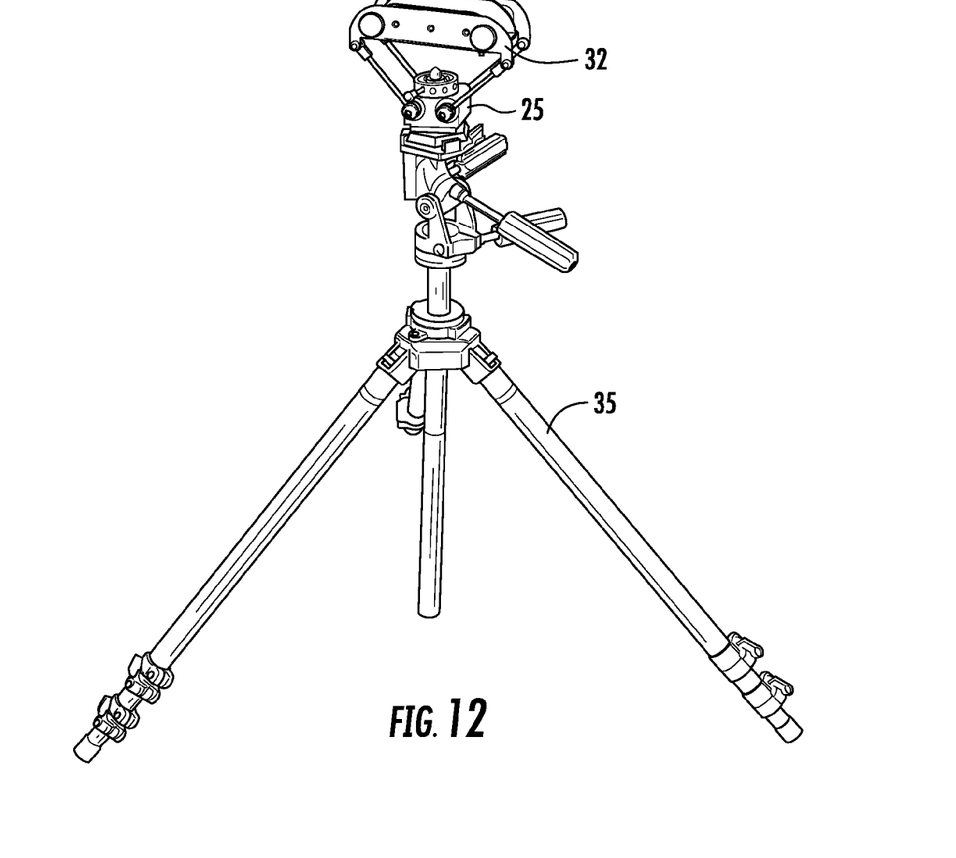
FIG. 12 is a perspective view of the adapter shown in FIG. 1, illustrating the adapter attached to a support structure.

Turning to FIGS. 9-11, when mounted on a support structure 35 such as a tripod, the present adapter 25 allows a user to use a firearm in many different terrains and environments because the tripod can be adjusted for use in prone, kneeling, sitting or standing positions. Further, when the present adapter 25 is used to attach a firearm to a support structure 35 such as a tripod, recoil that would normally be experienced by the user can be substantially reduced due to the added weight of the attached support structure 35.

Figure 3:
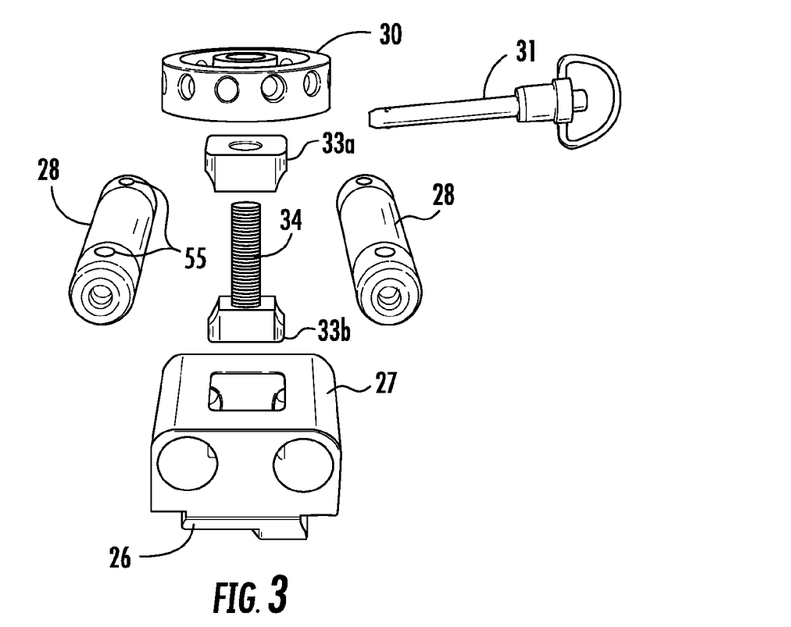
FIG. 3 is an exploded view of the lower portion of the adapter shown in FIG. 1.
Figure 4:
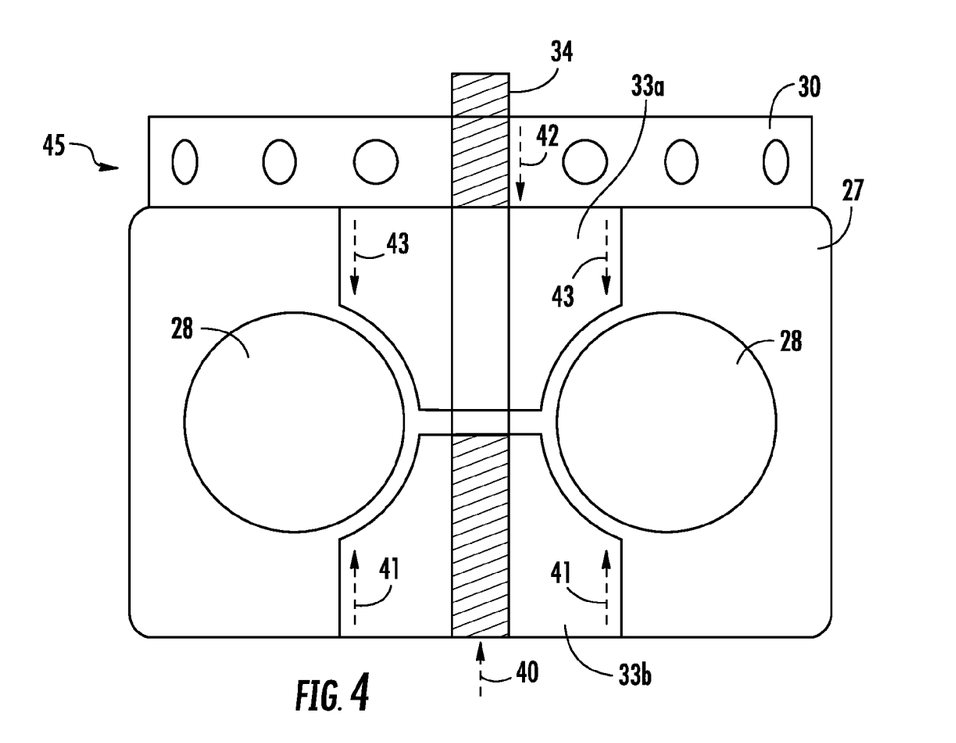
FIG. 4 is a sectional view of the lower portion of the adapter shown in FIG. 1.

As shown in FIG. 3, the present adapter 25 includes at least one rotating member 28. In the depicted embodiments, the adapter 25 includes two rotating members 28; however, other embodiments are contemplated wherein greater or lesser numbers of rotating members 28 are employed. As shown in the accompanying Figures, the rotating members 28 are arranged at least partially within a housing 27 which also holds at least a portion of a locking means 45 (see FIG. 4).

At least one arm 29 is included in the present adapter 25, and each arm 29 connects the at least one rotating member 28 to an accessory attachment member 32. Although the accompanying Figures illustrate the device 25 as including four arms 29 to connect the depicted rotating members 28 to the accessory attachment member 32, other embodiments are contemplated wherein greater or lesser numbers of arms 29 are employed to connect the at least one rotating member 28 to the accessory attachment member 32. The rotating members 28 may include one or more apertures 55 therein for receiving one end 47 of an arm 29, which is attached at the opposite end 46 to an accessory attachment member 32. The arm 29 may be attached to the accessory attachment member 32 by a fastener or by any other means known in the art. In this manner, the arm 29 connects each rotating member 28 to the accessory attachment member 32, thereby providing for movement of the accessory attachment member 32.

In the depicted embodiments, each rotating member 28 includes two apertures 55 therein, and one end of an arm 29 is inserted into each aperture 55 in the rotating member 28 to attach the arms 29 to the rotating member 28. Other means for attaching an arm 29 to a rotating member 28 that are known in the art may also be used and are considered to be within the spirit and scope of the present invention.

Figure 15:
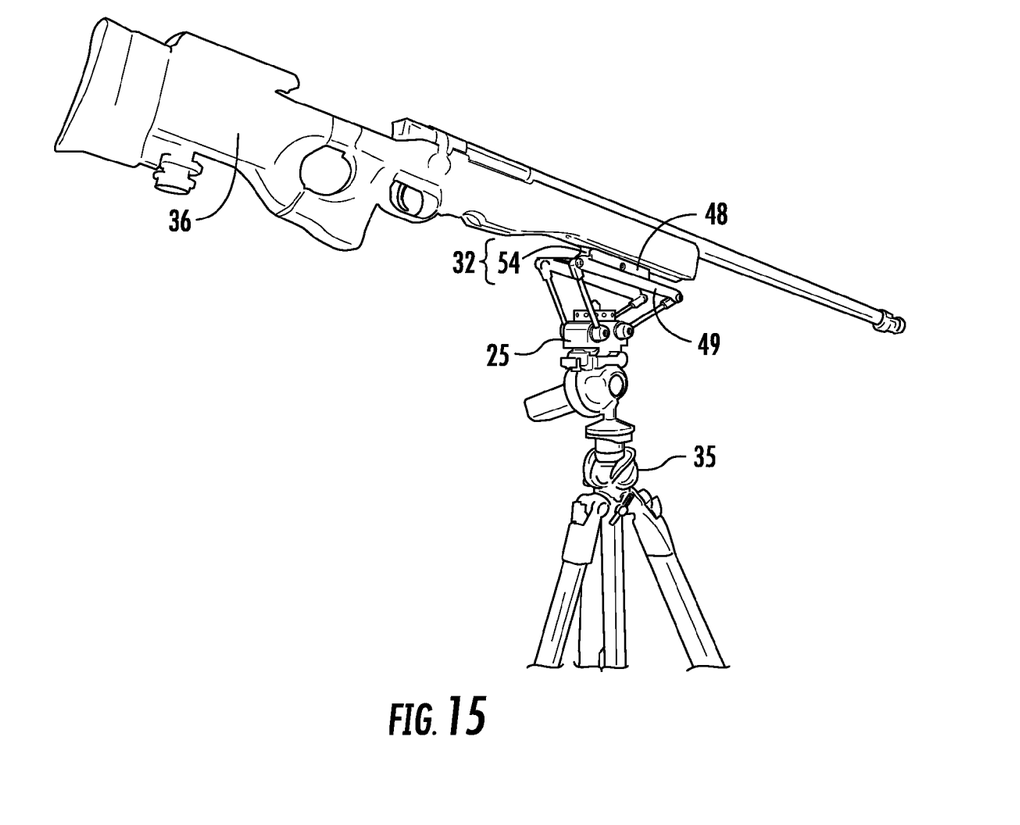
FIG. 15 is a perspective view of a firearm mounted on a support structure by means of the adapter shown in FIG. 14.
Figures 16, 17, 18:
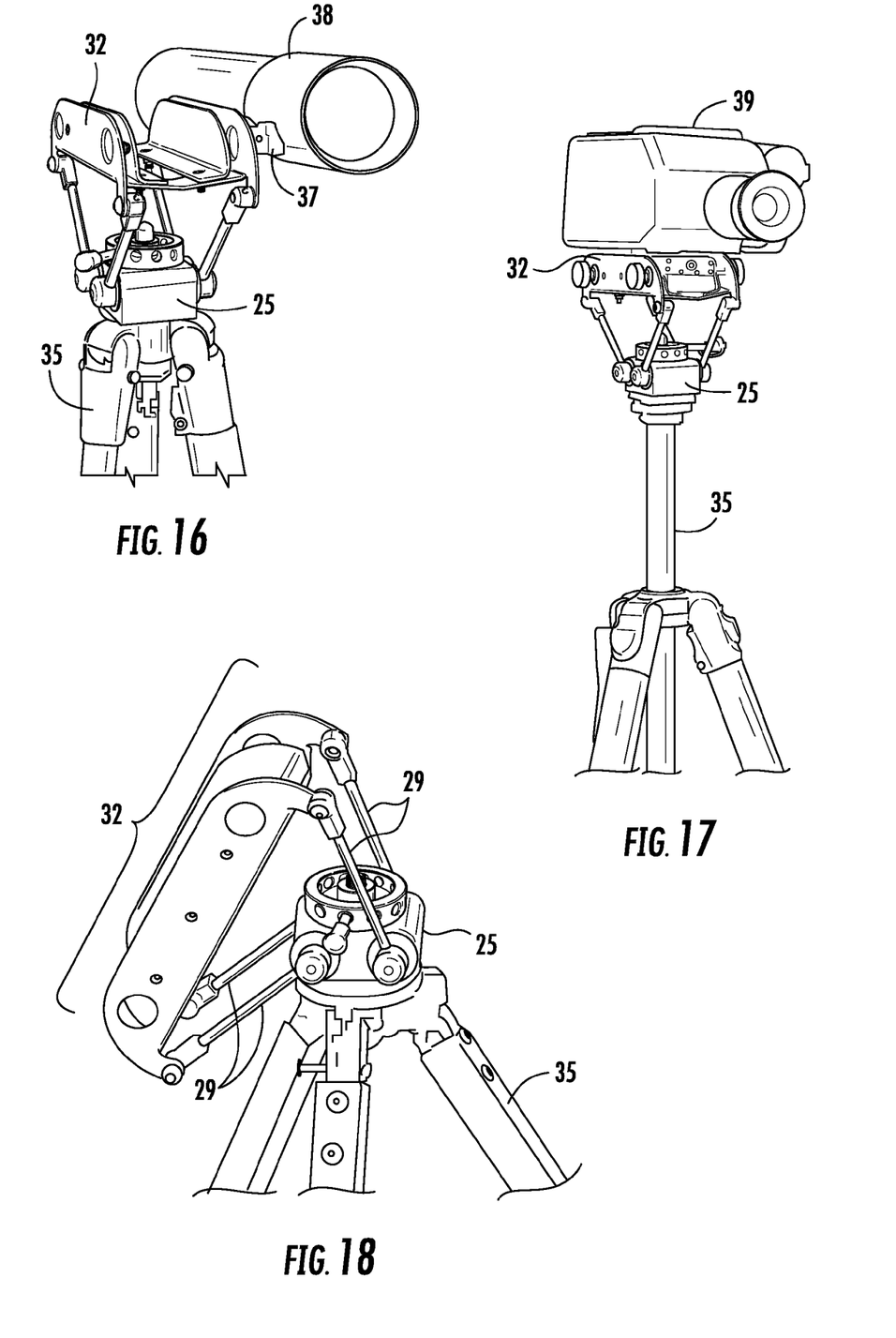
FIG. 16 is a front perspective view of the adapter shown in FIG. 13, illustrating an accessory attached to a side attachment means included on the upper portion of the adapter.
FIG. 17 is a perspective view of a camera mounted on a support structure by means of the adapter shown in FIG. 1.
FIG. 18 is a perspective view of the adapter shown in FIG. 1, illustrating the movement of the upper portion of the adapter.

The at least one arm 29 connects the at least one rotating member 28 to the accessory attachment member 32 in such a way that allows the accessory attachment member 32 to be tilted backwards and forwards as the at least one rotating member 28 rotates (see FIG. 18). In this manner, when an accessory is attached to the accessory attachment member 32, the accessory may be moved from a horizontal position (see FIG. 13) to an upwards or downwards angled position (see FIG. 15).

The locking means 45, in conjunction with the adapter's ability to tilt attached accessories upwards and downwards, provides a stable and consistent supporting means for firearms that allows users to lock a firearm in place at an extreme uphill or downhill angle without requiring holding support from the user, as depicted in FIG. 15. In one of the embodiments contemplated by the present invention, the locking means 45 (see FIG. 4) comprises locking members 33a and 33b, a locking shaft 34, and a locking actuator 30. In operation, the locking shaft 34 and the locking actuator 30 are arranged and configured to urge the locking members 33a and 33b into a locked position when the locking actuator 30 is turned in a first direction; the locking shaft 34 and the locking actuator 30 are arranged and configured to urge the locking members 33a and 33b into an unlocked position when the locking actuator 30 is turned in a second direction, said second direction being opposite of the first direction. In this embodiment, the locking members 33a and 33b are arranged and configured to provide frictional locking pressure 41 and 43 on the at least one rotating member 28 when the locking actuator 30 is turned in the first direction, which urges the locking members 33a and 33b into the locked position; the locking members 33a and 33b are arranged and configured to release the locking pressure 41 and 43 from the at least one rotating member 28 when the locking actuator 30 is turned in the second direction, which urges the locking members 33a and 33b into the unlocked position. In the unlocked position, the rotating member 28 is able to rotate, thereby allowing a user to move the accessory attachment member 32 backwards and forwards (see FIG. 18). Upon attachment of an accessory (e.g., 36, 38, or 39) to the accessory attachment member 32, the attached accessory can be tilted upwards or downwards when the adapter 25 is in the unlocked position. The locking actuator 30 may then be turned to the locked position to lock the attached accessory in an upwards or downwards tilted position. For example, FIG. 15 illustrates a firearm 36 that is attached to the accessory attachment member 32 and locked in a downwards tilted position.

As shown in FIGS. 5 and 6, the locking means 45 may further comprise a locking lever 31 coupled with the locking actuator 30. A user can manually move the locking lever 31 back and forth to move the locking means 45 to the locked position or to the unlocked position. In one of the embodiments contemplated by the present invention, the locking means 45 comprises a locking lever 31 coupled with a locking actuator 30, a threaded locking shaft 34, and locking members 33a and 33b. In this embodiment, one end of the threaded locking shaft 34 is attached to an internally threaded aperture in the lower locking member 33b; a central portion of the locking shaft 34 is received through a non-threaded aperture in the upper locking member 33a; and a second end of the locking shaft 34 is received by an internally threaded aperture in the locking actuator 30 (see FIG. 4). In this embodiment, a user can manually move the locking lever 31 in a first direction to force the locking actuator 30 to rotate down the threaded locking shaft 34 in the first direction; the locking actuator thereby creates a downward force 42 on the upper locking member 33a. At the same time, as the locking actuator 30 rotates down the locking shaft 34, the threaded locking shaft 34 is pulled in an upwards direction (in the orientation shown in FIG. 4). Since the locking shaft 34 is attached to the lower locking member 33b, as the locking shaft 34 is pulled upwards, the lower locking member 33b is likewise pulled upwards 40. This results in the upper locking member 33a and the lower locking member 33b engaging and applying opposing frictional forces, 43 and 41 respectively, to the at least one rotating member 28, thereby locking the rotating member 28 in a nonmoving position. The user can manually move the locking lever 31 in a second direction, opposite the first direction, to move the locking means 45 to the unlocked position, in which the locking members 33a and 33b disengage from the rotating member 28 and thus the opposing forces 43 and 41 are released from the rotating member 28.

The present adapter 25 further includes an accessory attachment member 32 for attaching an accessory (e.g, a firearm, spotting scope, laser rangefinder, binoculars, camera, etc.) to the device 25. Although the accompanying Figures illustrate various embodiments of the accessory attachment member 32, one skilled in the art can appreciate that there are many other possibilities that exist for attaching an accessory to the device, all of which are considered to be within the spirit and scope of the present invention.

Figure 1:
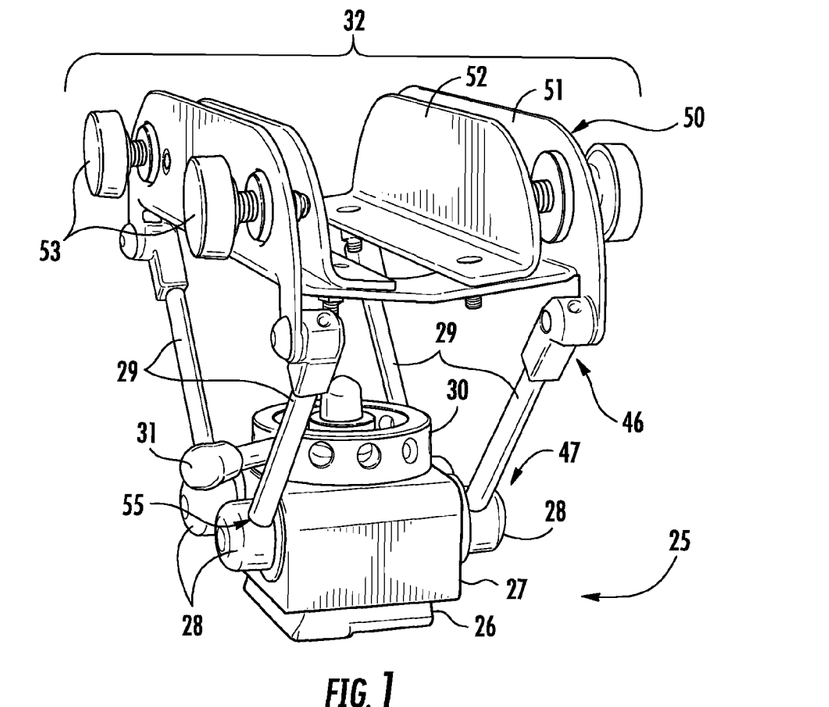
FIG. 1 is a perspective view of an adapter constructed in accordance with the teachings of the present disclosure.

In the embodiment depicted in FIG. 1, the accessory attachment member 32 comprises a cradle member 50 which includes an inner cradle 52, an outer cradle 51, and at least one pressure member 53 being received through an aperture in the outer cradle 51 and being arranged and configured to selectively engage the inner cradle 52. The pressure member 53 may define a fastener, screw, or any other means for applying pressure to the inner cradle 52. The at least one pressure member 53 may be received by a threaded aperture in the outer cradle 51 and may be rotated until the at least one pressure member 53 engages and puts pressure on the inner cradle 52. The at least one pressure member 53 may be rotated in an opposite direction to release the pressure put on the inner cradle 52. In this manner, when an accessory is placed in the inner cradle 52, the at least one pressure member 53 is rotated to put pressure on the inner cradle 52, thereby causing the inner cradle 52 to engage the accessory more tightly as more pressure is put on the inner cradle 52 by the at least one pressure member 53.

Figure 13:
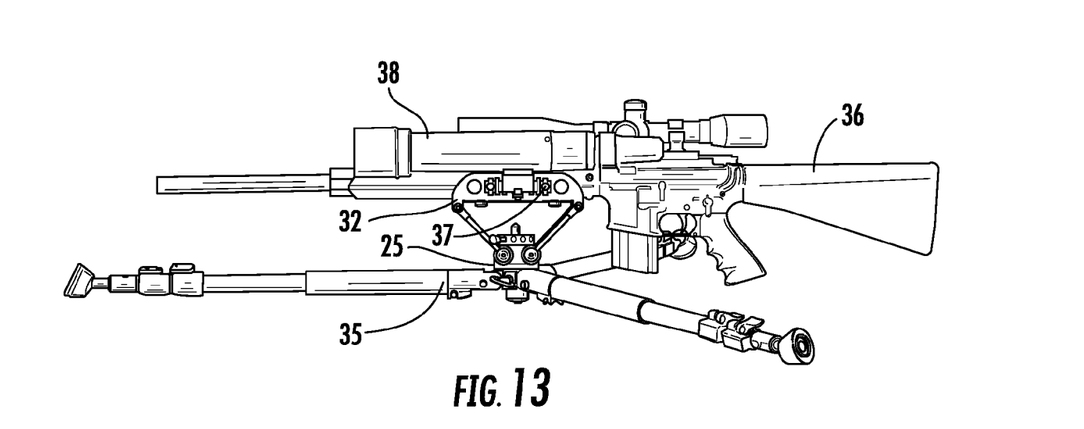
FIG. 13 is a side perspective view of a firearm and a spotting scope mounted on a support structure by means of an alternative embodiment of an adapter constructed in accordance with the teachings of the present disclosure.

Furthermore, as depicted in FIGS. 13 and 16, the cradle member 50 may include a side attachment means 37 for attachment of multiple accessories at once to the accessory attachment member 32. For example, it may be desirable or beneficial for many users, such as hunters and police officers, to attach both a firearm and a video camera to the accessory attachment member 32 at once, thereby allowing the user to document each shot fired as the camera moves in unison with the firearm. As depicted in FIG. 13, the inner cradle 52 engages the forend of a firearm 36 and a spotting scope 38 is attached to the side attachment means 37, which is disposed on the outer cradle 51. In the depicted embodiments, the side attachment means 37 comprises an accessory rail (e.g., a Picatinny rail) attached to the outer cradle 51.

Figure 14:
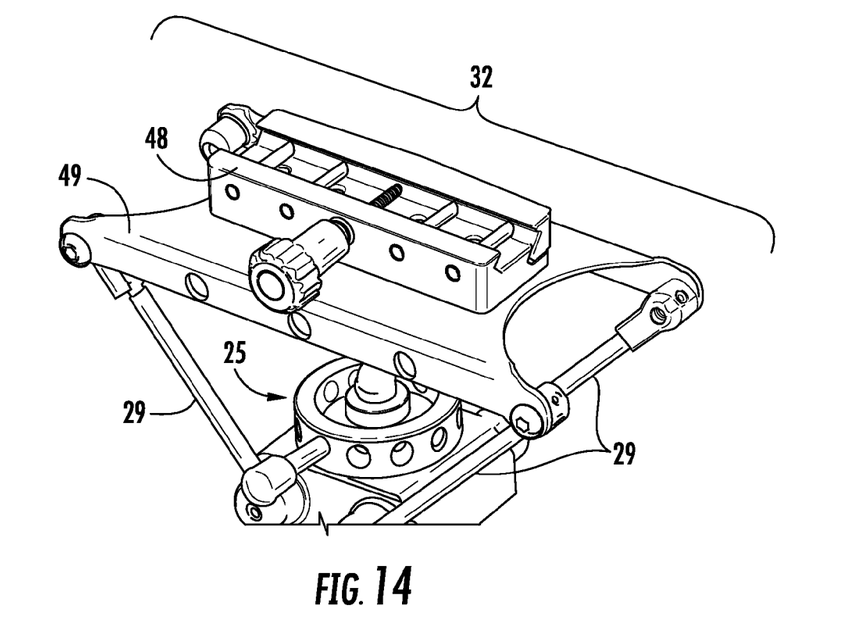
FIG. 14 is a perspective view of an alternative embodiment of an adapter constructed in accordance with the teachings of the present disclosure.

In an alternative embodiment depicted in FIG. 14, the accessory attachment member 32 comprises a support plate 49 and a mount adapter device 48, such as the device disclosed in U.S. patent application Ser. No. 12/895,680, entitled "Mount Adapter Device Utilizing a Push System," published Jul. 14, 2011, the disclosure of which is incorporated by reference herein. The mount adapter device may be attached to the support plate by any means known in the art. In this embodiment, any accessory having an accessory rail 54 (e.g., a Picatinny rail) attached thereto can be quickly and effortlessly attached to the mount adapter device 48 portion of the accessory attachment member 32, using the attachment mechanism discussed in the U.S. patent application Ser. No. 12/895,680 referenced above. FIG. 15 depicts a firearm 36 having an accessory rail 54 attached to the forend of the gunstock; the accessory rail 54 on the firearm 36 is shown attached to the mount adapter device 48 portion of the accessory attachment member 32.

Though the present adapter is discussed herein particularly with its application for use with firearms, note that it is not intended to limit the spirit and scope of the present invention solely for use in conjunction with firearms. The adapter can support a wide range of accessories including cameras, spotting scopes, binoculars, laser rangefinders, etc., either separately or in combination with one another.

The present invention clearly has a wide range of application in circumstances wherein an accessory is intended to be attached to a support structure in a manner that allows a user to quickly and effortlessly make precise positional adjustments and lock the attached accessory in place in relation to the support structure. Those skilled in the art will recognize that many types of support structures such as monopods, bipods, tripods, bench mounts and the like, may all be suitably employed, as the various embodiments of the present invention are not limited to the use of any specific support structure.

Many other uses of the present invention will become obvious to one skilled in the art upon acquiring a thorough understanding of the present invention. Furthermore, while the present invention has been illustrated by the description of one or more embodiments thereof, the foregoing is considered as illustrative only of the principles of the invention. Once given the above disclosures, many other features, modifications and variations will become apparent to the skilled artisan in view of the teachings set forth herein. Such other features, modifications and variations are, therefore, considered to be a part of this invention, the scope of which is to be determined by the following claims.

The invention claimed is:

1. An adapter for attaching one or more accessories to a support structure, comprising:
    a base configured for attachment to said support structure;
    a housing attached to said base;
    a first rotating member extending transversely through said housing, said first rotating member having a first end and a second end, at least a portion of said first rotating member being disposed within said housing;
    a locking means arranged and configured to selectively engage said first rotating member, at least a portion of said locking means being disposed within said housing;
    an accessory attachment member configured to receive said one or more accessories;
    a first arm having a first end and a second end, said first end of said first arm being attached to said accessory attachment member and said second end of said first arm being attached to said first end of said first rotating member; and
    a second arm having a first end and a second end, said first end of said second arm being attached to said accessory attachment member and said second end of said second arm being attached to said second end of said first rotating member,
    wherein when said locking means is not in locking engagement with said first rotating member, said first rotating member can rotate to provide for movement of said accessory attachment member.

2. The adapter according to claim 1, wherein the base defines a camera mounting plate.

3. The adapter according to claim 2, wherein the support structure includes a quick-attach tripod head for receiving said base.

4. The adapter according to claim 1, wherein the support structure is a tripod.

5. The adapter according to claim 1, wherein the support structure is a bipod.

6. The adapter according to claim 1, wherein the support structure is a monopod.

7. The adapter according to claim 1, wherein the support structure is a bench mount.

8. The adapter according to claim 1, wherein said one or more accessories comprise a firearm, a camera, a spotting scope, binoculars, and a laser range finder, either separately or in combination with one another.

9. The adapter according to claim 1, wherein the locking means comprises:
- one or more locking members for selectively engaging said first rotating member;
- a locking shaft; and
- a locking actuator coupled with said locking shaft and arranged and configured to selectively force said one or more locking members into engagement with said first rotating member.

10. An adapter for attaching one or more accessories to a support structure, comprising:
- a base configured for attachment to said support structure;
- a housing attached to said base;
- a first rotating member extending transversely through said housing, said first rotating member having a first end and a second end, at least a portion of said first rotating member being disposed within said housing;
- a locking means arranged and configured to selectively engage said first rotating member, wherein the locking means comprises:
  - one or more locking members for selectively engaging said first rotating member,
  - a locking shaft,
  - a locking actuator coupled with said locking shaft and arranged and configured to selectively force said one or more locking members into engagement with said first rotating member, and
  - a locking lever coupled with said locking actuator;
- an accessory attachment member configured to receive said one or more accessories;
- a first arm having a first end and a second end, said first end of said first arm being attached to said accessory attachment member and said second end of said first arm being attached to said first end of said first rotating member; and
- a second arm having a first end and a second end, said first end of said second arm being attached to said accessory attachment member and said second end of said second arm being attached to said second end of said first rotating member.

11. An adapter for attaching one or more accessories to a support structure, comprising:
- a base configured for attachment to said support structure;
- a housing attached to said base;
- a first rotating member extending transversely through said housing, said first rotating member having a first end and a second end, at least a portion of said first rotating member being disposed within said housing;
- a locking means arranged and configured to selectively engage said first rotating member, wherein the locking means comprises:
  - one or more locking members for selectively engaging said first rotating member,
  - a locking shaft, and
  - a locking actuator coupled with said locking shaft and arranged and configured to selectively force said one or more locking members into engagement with said first rotating member,
  - wherein said one or more locking members includes an upper locking member and a lower locking member, and wherein one end of said locking shaft is attached to the lower locking member, a central portion of the locking shaft is received through the upper locking member, and a second end of the locking shaft is engaged with the locking actuator, whereby the locking actuator may be rotated up and down the second end of the locking shaft;
- an accessory attachment member configured to receive said one or more accessories;
- a first arm having a first end and a second end, said first end of said first arm being attached to said accessory attachment member and said second end of said first arm being attached to said first end of said first rotating member; and
- a second arm having a first end and a second end, said first end of said second arm being attached to said accessory attachment member and said second end of said second arm being attached to said second end of said first rotating member.

12. The adapter according to claim 1, wherein the accessory attachment member comprises a cradle member, including:
- an outer cradle attached to said first end of said first arm and to said first end of said second arm;
- an inner cradle disposed inside said outer cradle; and
- at least one pressure member being arranged and configured to selectively engage said inner cradle.

13. The adapter according to claim 12, wherein said outer cradle includes one or more apertures therethrough for receiving each of said at least one pressure members, which may be received through the apertures in order to selectively engage said inner cradle.

14. The adapter according to claim 12, wherein said cradle member includes a side attachment means for attachment of an additional accessory to the accessory attachment member.

15. The adapter according to claim 14, wherein the side attachment means is an accessory rail attached to the outer cradle.

16. The adapter according to claim 14, wherein at least two accessories are attached to the accessory attachment member, one accessory being at least partially disposed within said inner cradle and a second accessory being attached to said side attachment means.

17. The adapter according to claim 1, wherein the accessory attachment member comprises a support plate attached to said first end of said first arm and to said first end of said second arm, and a mount adapter device attached to said support plate.

18. The adapter according to claim 1, further comprising:
- a second rotating member extending transversely through said housing, at least a portion of said second rotating member being disposed within said housing,
- wherein said locking means is arranged and configured to selectively engage said second rotating member.

19. The adapter according to claim 18, further comprising:
a third arm having a first end and a second end, said first end of said third arm being attached to said accessory attachment member and said second end of said third arm being attached to said second rotating member; and
a fourth arm having a first end and a second end, said first end of said fourth arm being attached to said accessory attachment member and said second end of said fourth arm being attached to said second rotating member.

20. The adapter according to claim 1, wherein said first arm is defined as a narrow rod extending from said first end of said first arm to said second end of said first arm, and said second arm is defined as a narrow rod extending from said first end of said second arm to said second end of said second arm.

\* \* \* \* \*